Patented Sept. 28, 1954

2,690,388

UNITED STATES PATENT OFFICE 2,690,388

SEED GERMINATION

William J. Hale, Midland, Mich., assignor to Verdurin Company, Detroit, Mich., a corporation of Michigan No Drawing. Application May 17, 1951,
Serial No. 226,939

16 Claims. (Cl. 71—2.5)

This invention relates to improvements in seed germination, more particularly of inducing and accelerating the fixation of nitrogen by young plants.

It has been known that dried blood greatly contributes to the value of a compost with which it is mixed. It has also been known, as established by the investigation of Dr. M. C. Rayner, at Belford College, London, England, in collaboration with Sir Albert Howard, that the best composts for the development of propitious fungi, such as the mycorrhiza, should contain not only dried blood but also brewery hop waste ("An Agricultural Testament," by Albert Howard, Oxford University Press, 1940).

The roots of many plants are infested with microscopic fungi; the best known of these fungi, which so admirably serve the needs of plant growth and are indispensable to its well-being, is the mycorrhiza. Of this fungus there are two distinct groups; one that encases the roots, and the second that invades the root cells. Both roots and fungi live off of the humus in the soil and together bestow especial benefits upon each other—a true example of symbiosis. Although this symbiotic relationship between roots and fungi was pointed out in 1877 by the German biologist Wilhelm Pfeffer, it is only of late that it is realized that in the growing process the fungous threads of the mycorrhiza are digested by the plant through its roots. This digested material, rich in proteins and carbohydrates, enters the sap-stream and aids in maturing the plant.

Generally speaking, molds, fungi and other micro-organisms possess a remarkable avidity for tearing down the most complicated of organic chemical compounds to yield matter freely assimilable to plant roots; yet at the same time producing distinctive chemical entities that enter the sap stream as such and therein play a role of vital importance in plant metabolism. There is every reason here to ascribe the formation of plant enzymes to this exact source. The full purport of enzymes of dehydration, oxidation, reduction and condensation, all within the same habitat, and at work on the reduction products of carbonic acid from the atmosphere, by the catalyst chlorophyll under activation by sunlight, is yet to be fully understood.

It is apparent whatever favors the formation within a growing plant of specifically active enzymes, containing carbon, hydrogen, and oxygen together with nitrogen, sulfur and several other elements, will tend to accentuate the general course of plant development. As already noted, the effect of certain vitamins, especially of the B complex, is productive of good results. Another type of compound, usually of the indole type, is decidedly effective in inducing root growth; such compounds are called auxins or hormones as they are naturally producible by the plant itself. When applied from without, these hormones are likely to induce such rapid growth of root systems that the latter burst and die; an example here is that of 2,4-dichlorophenoxyacetic acid (2,4-D). The major purpose of the invention is to institute those conditions that enable the plant itself to produce within its sphere of growth those exact enzymes and hormones that best function to this growth.

It is common knowledge that the presence of iron in the germinating seed, or in close juxtaposition thereto, serves as a catalyst for the production of chlorophyll, without which we cannot have leaf growth. It was originally thought that when dried blood is added to a compost the addition comprised simply one of soluble iron. Recent work, however, indicates that such use of dried blood involves much more than just soluble iron. In dried blood are regularly present both erythrocytes and leucocytes with protein accompaniments; likewise a number of amino acids, notably methyl guanadyl acetic acid (creatine) and its anhydride (creatinine), and glutamic acid and its amide glutamine and aspartic acid and its amide asparagine; small amounts of cholesterol (protector of red blood corpuscles against hydrolysis), and phospholipoids; together with a host of proteolytic and diastatic enzymes.

A recent report by Virtanen and Laine of the Biochemical Institute of Helsinki, Finland ("Nature" for January 5, 1946, p. 25) definitely proves that the fixation of atmospheric nitrogen by plants is due primarily to the continuing change from the brown pigment, methemoglobin, back into the red pigment hemoglobin, both of which are present in leguminous root nodules; oxygen, in turn, carries the red pigment over to the brown, hence aeration of soils becomes a necessary concomitant. Too much oxygen may succeed in breaking the porphyrin structure of red hemoglobin, centering upon ferrous iron, and of brown methemoglobin, centering upon ferric iron, yielding a green pigment no longer serviceable as such in this equilibrium.

Accompanying the hemoglobin in root nodules these investigators identified keto succinic (oxalacetic) acid in form of neutral salt. The presence of oxalacetic acid in seedlings arises through the breakdown of carbohydrates. Along with this acid are to be found aspartic acid and glutamic acid in most plants, and all of these are amino acceptors. When they immersed brown root nodules into a very dilute keto succinic acid salt solution the nodules turned red within an hour or two; under sunlight the change was rapid. In that the presence of keto succinic acid in plant sap is always at a peak on bright sunny days, these investigators next proved that on bright days also is the peak of nitrogen fixation; verified also by the greatest change from brown to red pigment.

To the plant biologist it is known that at the end of the flowering there is no further production of keto succinic acid in sap stream and hence no further fixation of nitrogen by plant roots. To the biochemist it is known that nitrogen fixation is the accompaniment of the change of brown methemoglobin into red hemoglobin wherein there is simultaneously produced hydroxylamine, or other soluble nitrogen compound, direct from atmospheric nitrogen but only in the presence of keto compounds.

It is now known that these keto compounds present in the sap stream are of such activity as to be able to unite chemically with soluble nitrogen compounds during the process of growth and to lead directly to formation of the pyrrole ring of four carbons and one nitrogen. The grouping of four of these rings (with certain substituent groups) about a ferrous or divalent iron atom constitutes the well-known hematin which when united with a protein is known as hemoglobin. In the plant world, however, the counterpart of hematin is phyllin so well represented by chlorophyll (of certain other substituent groups) but with an atom of magnesium occupying the central position. Hence though hemoglobin may serve through its property of oxidation to ferric state and then reduction to ferrous state to attach hydrogen directly to nitrogen (fixation), the subsequent function of building up carbon-nitrogen complexes must be transposed to a chlorophyll basis, as the magnesium is the element par excellence that is necessary for capturing carbonic acid from the air and reduction of same through enzymes to all of the substances that make up our flora.

In brief, the molecule of hemoglobin is here seen to serve as a catalyst for the production of chlorophyll, all of which is well substantiated in practice. But in addition to the formation of chlorophyll the growing plant calls for a continuous supply of other reactants capable of effecting the transformations of simple sugars to the whole of plant substance as brought into being by nature. These reactants comprise enzymes and hormones working in sap stream or within cell compartments through osmosis.

As explained in prior application Ser. No. 709,796, it was found when seed is pelleted with a suitable encasement containing dried blood together with certain keto aliphatic compounds such as oxalacetic acid a two-fold advantageous effect was secured; the first comprising supplying the sprouting seeds with soluble and absorbable hemoglobin and the proper keto acids for inducing nitrogen fixation and the second comprising supplying the sprouting seeds with soluble and assimilable protein decomposition products of blood and proper oxo-reactants for inducing the formation of desirable hormones and enzymes. The preferred procedure described in such application comprised the utilization, in a suitable encasement substance, of dried ox blood together with small amounts of a suitable keto aliphatic compound such as ketosuccinic acid, pyruvic acid and similar type compounds. In this manner that portion of the dried blood outside the hemoglobin is made available for condensation with active organic chemicals and to the end that considerable enzymatic material can find early utilization within the sprouting plant. A wide range of enzymatic material will activate the porphyrin molecule so long as it has an iron metallic complex as is found in the compound hematin. The iron porphyrin compounds having a prostatic group as found in dried blood are very effective. In the preferred procedure, as explained in the prior application, enhanced germination and sprouting are achieved by bringing the seeds in contact, through the medium of a slowly water soluble encasement, with such keto aliphatic compounds, and dried blood. The pellet similarly may be made to contain other beneficially functioning substances such as fertilizers, hormones such as indole acetic acid and indole butyric acid, and additional stimulants such as chlorophyll.

It has now been found that keto compounds other than the keto aliphatic compounds described in the earlier application react with dried blood to quickly induce nitrogen fixation and otherwise desirably improve the germination of the seed and growth of the plant.

In further experimentation in this particular field, it has been ascertained that certain heterocyclic keto compounds, when associated with a metallo-porphyrin such as dried blood, can effect conversion of the latter with concomitant fixation of nitrogen and make available to the sprouting seeds the assimilable protein decomposition products of the dried blood. In the light of present knowledge it is not known whether such heterocyclic compounds act on the dried blood directly or through the action of its decomposition products. Effective examples of the keto heterocyclic compounds comprehended by the invention are (1) kojic acid and other gamma pyrones as (2) maltol and (3) pyromeconic acid:

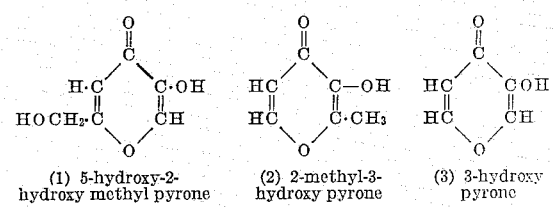

(1) 5-hydroxy-2-hydroxy methyl pyrone  (2) 2-methyl-3-hydroxy pyrone  (3) 3-hydroxy pyrone Kojic acid is a gamma pyrone that hydrolyzes to the corresponding alpha and beta keto alcohol which latter oxidizes to the corresponding keto acid. Another compound of this general class is dehydracetic acid.

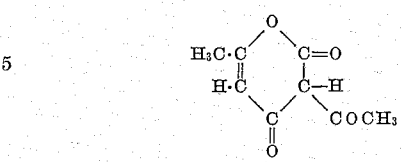

(3. acetyl-6-methyl-2,4 dioxo-1,2 pyran)

The value of the invention can be more readily appreciated from a consideration of planting tests carried out in which the principles of the invention were invoked. The test seed employed was segmented sugar beet seed. The seeds were prepared by coating them with a composition containing the amounts of adjuvants indicated in the examples. These adjuvants were incorporated in a dilute spray of an aqueous solution of a hydrophilic binder, preferably methyl cellulose in which was dispersed an inert filler material, specifically fly ash. For purposes of comparison and evaluation uncoated seeds and pelleted seeds containing fungicides and fertilizer were used as controls as set forth in Examples 1 and 2.

The recorded tests on emergence of sugar beet seed were carried out in flats of 50 seeds indoors and in plantings of 100 seeds outdoors. The results of these tests are recorded below:

| | Seeds Treated | Indoors (3 runs) out of 50 seeds total emergence 28 days | Outdoors (3 runs) out of 100 seeds total emergence 28 days |
|---|---|---|---|
| Example 1 | Unpelleted bare sugar beet seed (segmented) | 21, 20, 17—average= 38.6% emergence. | 23, 29, 30—average= 27.3% emergence. |
| Example 2 | Pelleted seed containing regular fungicide and fertilizer: 7½% arosan, 10% superphosphate pellet #801.5. | 33, 25, 29—average= 58% emergence. | 49, 51, 47—average= 49% emergence. |
| Example 3 | Pelleted seed with fungicide and fertilizer as in Ex. 2 plus 1,200 parts/million of dried blood and 200 parts/million of kojic acid pellet #801.5a. | 48, 47, 46—average= 94% emergence. | 81, 80, 82—average= 81% emergence. |

Similar tests were carried out utilizing dehydracetic acid with calcium carbonate in lieu of kojic acid (calcium salt) in the seed pellet. Under similar test conditions the seed containing dehydracetic acid shows 60% average emergence on the outdoors run. This compound, while not as effective as kojic acid, nevertheless displayed a much higher percentage of emergence than the control recorded in Example 2.

Additional tests established the fact that when the hormone indole butyric acid was incorporated in the pellet in minor amounts, of the order of 50 parts per million of the pellet, a slight increase in average emergence resulted.

It has also been found that chlorophyll and the chlorophyll-carotenoid extract of green vegetable matter may be incorporated in pelleting formulations such as those desribed above, to enhance the development in germination of the seed and growth of the plant.

The encasement or coating which carries the beneficially functioning adjuvants may be formed on the seeds in any suitable manner. the hydrophilic binder employed may be any suitable water soluble binder such as methyl cellulose, starch, polyvinyl alcohol, dextrins, sodium alginate and the like. The coating on the seed may be formed by spraying on the seeds a solution of the water soluble binder while simultaneously applying a stream of inert filler material such as fly ash or feldspar of about 300 mesh together with the desired adjuvants such as fertilizers, fungicides, hormones, dried blood and the keto-type compounds. During such application the seeds are preferably whirled or tumbled in a rotating drum to build up the coating and to produce pellets of the desired size. The thickness of the encasement of shield on the seed may be varied over relatively wide limits so as to correlate the pelleted seed with the moisture characteristics of the soil in which it is to be planted.

While preferred modifications of the invention have been described, it is to be understood that these are given to illustrate the broad concepts of the invention and not as limiting its useful scope to the illustrative examples presented.

I claim:

1. A method of improving the sprouting and growth of seeds, roots and bulbs which comprises applying to the surface of the seeds, roots and bulbs an inert carrier material containing a porphyrin metallic complex and a gamma pyrone compound.

2. A method of improving the germination of seeds, roots and bulbs which comprises encasing such seeds, roots and bulbs with an inert carrier containing dried hematin-containing animal fluid together with a gamma pyrone compound capable upon hydrolysis of forming both an alpha and beta keto aliphatic compound.

3. A method of improving the germination of seeds, roots and bulbs which comprises encasing such seeds, roots and bulbs with an inert carrier containing dried hematin-containing material together with kojic acid.

4. A method of improving the germination of seeds, roots and bulbs which comprises encasing such seeds, roots and bulbs with an adherent but disintegratable mass of functioning divided inert material and a water soluble binder in which is incorporated dried blood and kojic acid.

5. An article of commerce comprising a seed having an encasing shell comprised of an inert powder and a hydrophilic binder, said binder being capable of dissolution in moist soil within which shell is incorporated a porphyrin metallo compound and a small amount of kojic acid.

6. An article of commerce comprising a seed having an encasing shell comprised of an inert powder and a hydrophilic binder, said binder being capable of dissolution in moist soil within which shell is incorporated a porphyrin metallo compound, fertilizing material and a small amount of kojic acid.

7. An article of commerce comprising a seed having an encasing shell comprised of an inert powder and a hydrophilic binder, said binder being capable of dissolution in moist soil within which shell is incorporated a porphyrin metallo compound, fertilizing material, a fungicide and a small amount of kojic acid.

8. An article of commerce comprising a seed having an encasing shell comprised of an inert powder and a hydrophilic binder, said binder being capable of dissolution in moist soil within which shell is incorporated a porphyrin metallo compound and a small amount of dehydracetic acid.

9. An article of commerce comprising a seed having an encasing shell comprised of an inert powder and a hydrophilic binder, said binder being capable of dissolution in moist soil within which shell is incorporated a porphyrin metallo compound, fertilizing material and a small amount of dehydracetic acid.

10. An article of commerce comprising a seed having an encasing shell comprised of an inert powder and a hydrophilic binder, said binder being capable of dissolution in moist soil within which shell is incorporated a porphyrin metallo compound, fertilizing material, a fungicide and a small amount of dehydracetic acid.

11. A method in accordance with claim 1 in which the gamma pyrone compound is dehydracetic acid.

12. A method in accordance with claim 1 in which the gamma pyrone compound is maltol.

13. A method in accordance with claim 1 in which the gamma pyrone compound is pyromeconic acid.

14. An article of commerce comprising a seed having an encasing shell comprised of an inert powder and a hydrophilic binder being capable of dissolution in moist soil, within which shell is incorporated a porphyrin metallo-compound and a small amount of a gamma pyrone.

15. A product in accordance with claim 14 in which the gamma pyrone is maltol.

16. A product in accordance with claim 14 in which the gamma pyrone is pyromeconic acid.

References Cited in the file of this patent

UNITED STATES PATENTS

| Number | Name | Date |
|---|---|---|
| 2,553,577 | Hale | May 22, 1951 |

FOREIGN PATENTS

| Number | Country | Date |
|---|---|---|
| 591,951 | Great Britain | Sept. 3, 1947 |